United States Patent
Overeem

(10) Patent No.: US 10,894,839 B2
(45) Date of Patent: Jan. 19, 2021

(54) PROCESS FOR MAKING SUGAMMADEX

(71) Applicant: Synthon B.V., Nijmegen (NL)

(72) Inventor: Arjanne Overeem, Nijmegen (NL)

(73) Assignee: Synthon B.V., Nijmegen (NL)

( * ) Notice: Subject to any disclaimer, the term of this patent is extended or adjusted under 35 U.S.C. 154(b) by 0 days.

(21) Appl. No.: 16/311,495

(22) PCT Filed: Jun. 22, 2017

(86) PCT No.: PCT/EP2017/065377
§ 371 (c)(1),
(2) Date: Dec. 19, 2018

(87) PCT Pub. No.: WO2017/144734
PCT Pub. Date: Aug. 31, 2017

(65) Prior Publication Data
US 2019/0185589 A1    Jun. 20, 2019

(30) Foreign Application Priority Data

Jun. 23, 2016 (EP) .................... 16176034

(51) Int. Cl.
*C08B 37/16* (2006.01)
(52) U.S. Cl.
CPC ............... *C08B 37/0012* (2013.01)
(58) Field of Classification Search
CPC .... C08B 36/16; C08B 37/0012; A61K 31/724
USPC ........................................ 536/103
See application file for complete search history.

(56) References Cited

U.S. PATENT DOCUMENTS 6,670,340 B1 * 12/2003 Zhang ............... C08B 37/0012
514/58

FOREIGN PATENT DOCUMENTS

| WO | WO 00/40316 | 7/2000 | | |
|---|---|---|---|---|
| WO | 2001/040316 | 6/2001 | | |
| WO | WO 2012/025937 A1 | 3/2012 | | |
| WO | WO 2014/125501 A1 | 8/2014 | | |
| WO | WO 2016/194001 A1 | 12/2016 | | |
| WO | WO 2016/194001 A1 * | 8/2018 | ............. | C08B 37/16 |
| WO | WO2019/002610 A1 | 1/2019 | | |

OTHER PUBLICATIONS

Chmurski et al., "An Improved Synthesis of 6-Deoxyhalo Cyclodextrins via Halomethylenemorpholinium Halides Vilsmeier-Haack Type Reagents" *Tetrahedron Letters*, vol. 38, No. 42, Oct. 20, 1997, pp. 7365-7368.

* cited by examiner

*Primary Examiner* — Ganapathy Krishnan
(74) *Attorney, Agent, or Firm* — Buscher Patent PLLC

(57) ABSTRACT

The invention deals with a novel process for making the pharmaceutically useful product Sugammadex of formula (1)

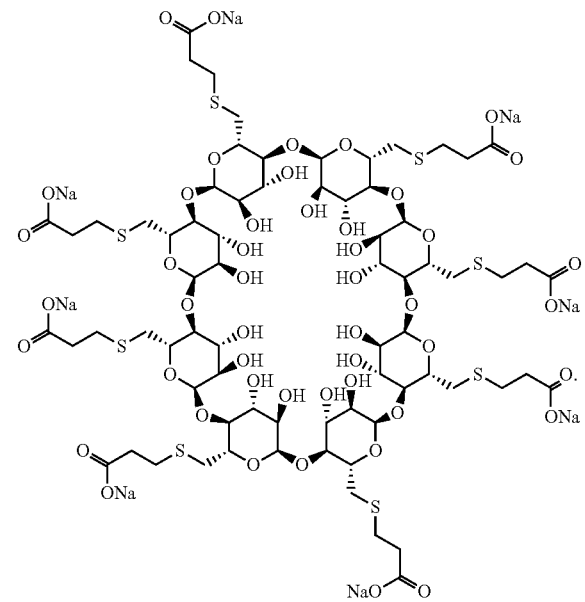

13 Claims, No Drawings

PROCESS FOR MAKING SUGAMMADEX

The invention relates to a novel process for making the pharmaceutical product Sugammadex.

OVERVIEW OF THE PRIOR ART

Sugammadex, i.e. 5-Cyclooctakis-(1→4)-[6-S-(2-carboxyethyl)-6-thio-alfa-D-glucopyranosyl] of formula (1),

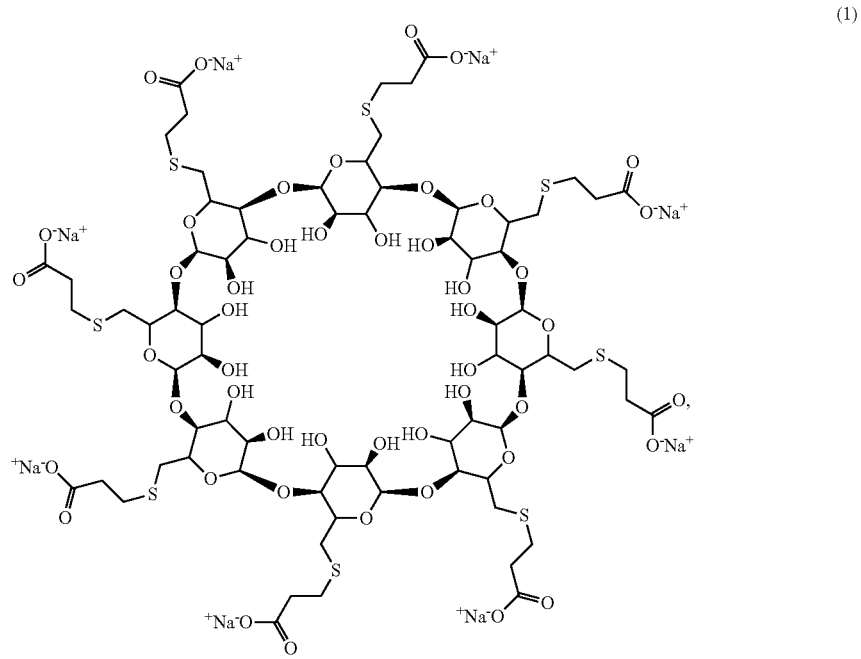

(1)

is a modified γ-cyclodextrin.

Sugammadex is the first selective relaxant binding agent for reversal of neuromuscular blockade by the agent rocuronium or vecuronium in general anesthesia. It was approved in 2008 by EMEA. It is marketed in the form of a sterile solution for intravenous injection under the brand name Bridion®.

Sugammadex was first disclosed in WO2001/040316.

WO2001/040316 discloses a process for making Sugammadex as depicted below

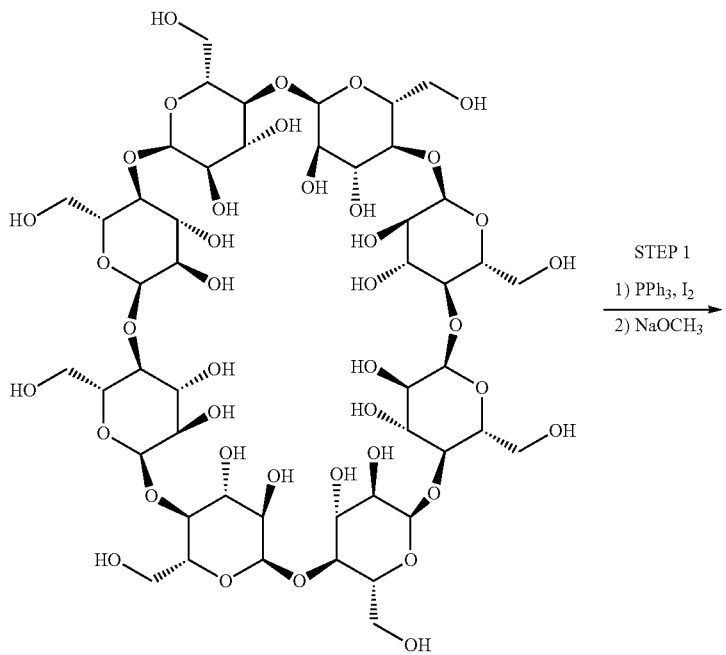

STEP 1
1) $PPh_3$, $I_2$
2) $NaOCH_3$

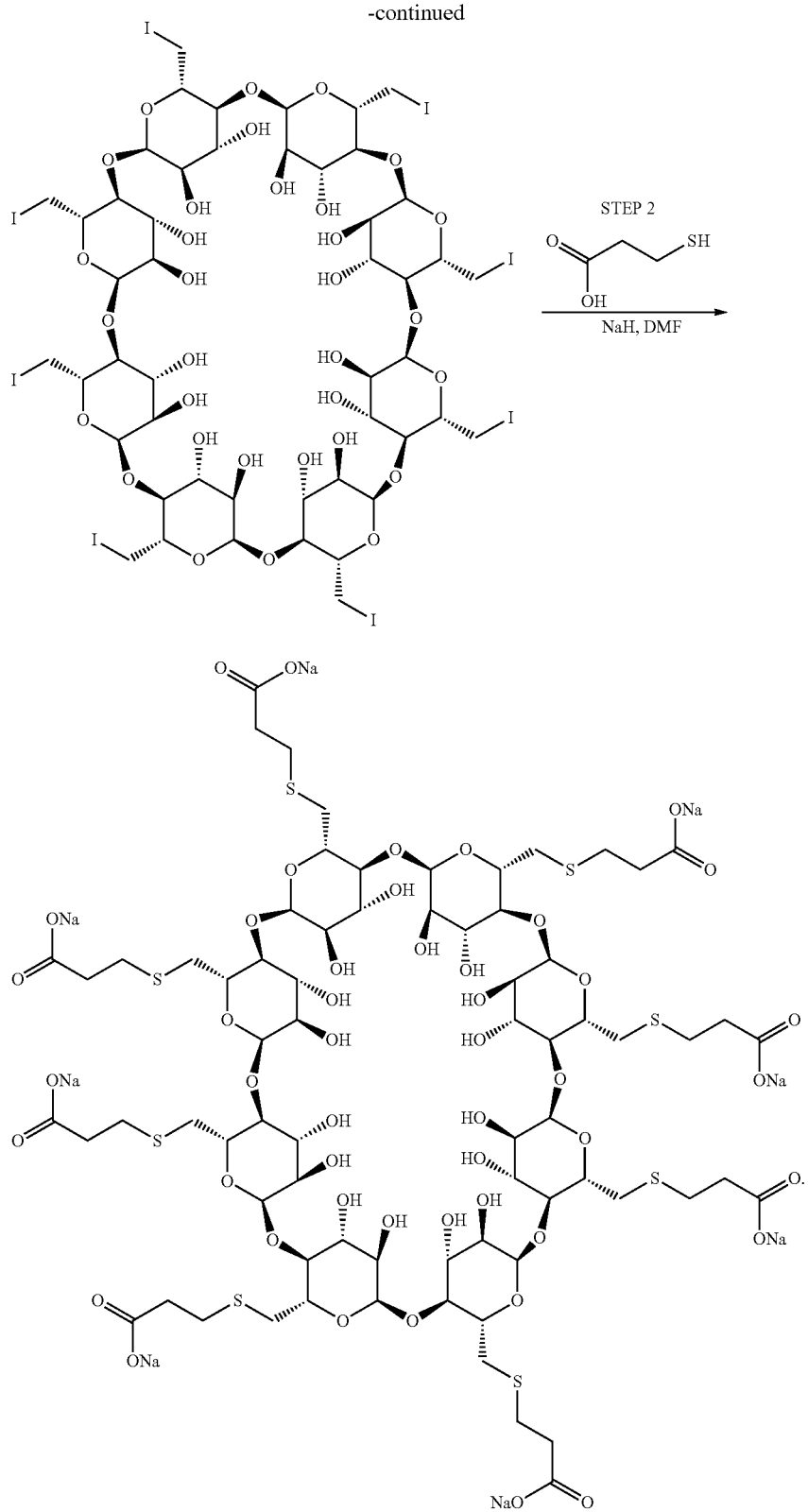

The first step involves the in situ preparation of a Vilsmeier-Haack reagent by the reaction of dymethylformamide (DMF), triphenylphosphine (PPh₃) and iodine to form an activated γ-cyclodextrin. Triphenylphosphine oxide is formed as a by-product of the first step. The removal of this by-product from the reaction mixture is very difficult. This by-product will react in the second step to form the impurity of formula (2),

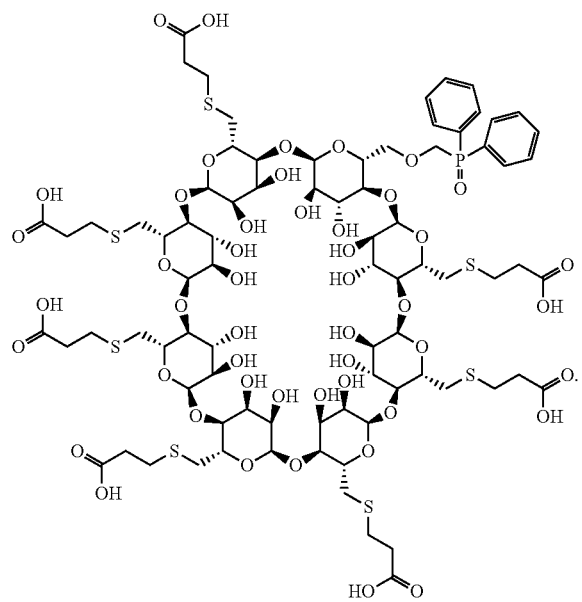

(2)

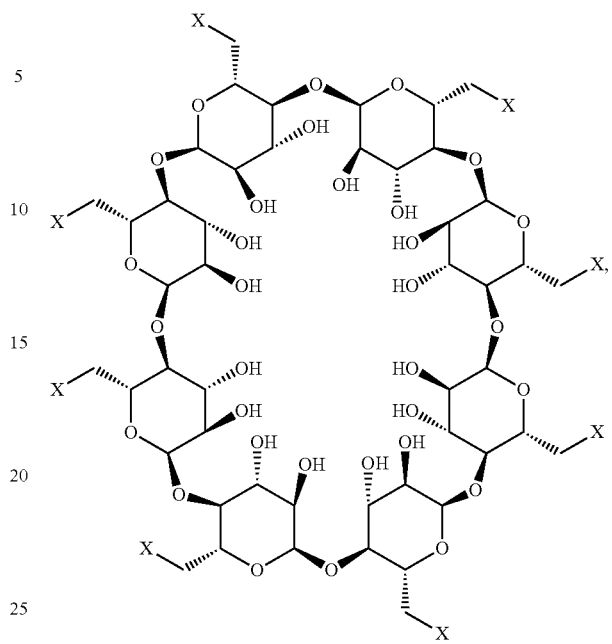

(3)

wherein X is F, Cl, Br, I;

b) Reacting the compound of formula (3) with 3-mercaptopropionic acid in the presence of a sodium base and DMSO.

DETAILED DESCRIPTION OF THE PRESENT INVENTION

The present invention provides an alternative route for making Sugammadex of formula (1) based on employing DMSO and a metal sodium base.

The invention provides a process to synthesize Sugammadex comprising the steps of:

a. Substituting the primary hydroxyl groups of the γ-cyclodextrin by halogen to give the corresponding 6-perdeoxy-6-per-halo-γ-cyclodextrin compound of formula (3), (3)

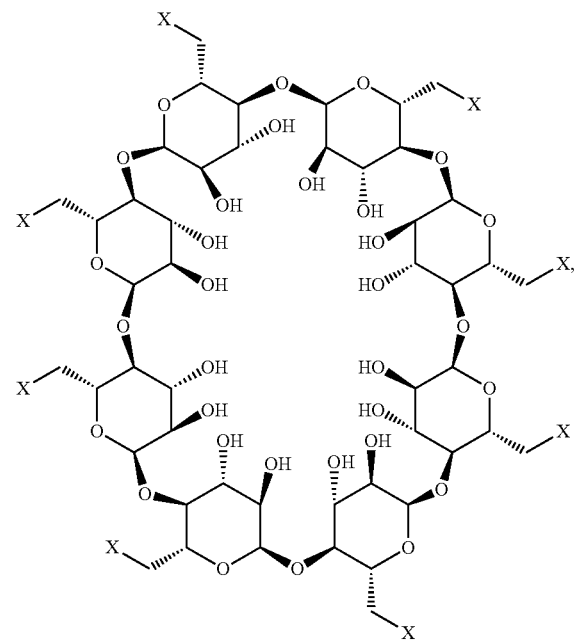

wherein X is F, Cl, Br, I;

The second step involves the reaction of the functionalized γ-cyclodextrin with 3-mercaptopropionic acid in presence of NaH, which is hazardous, and in presence of DMF, which is toxic, to give Sugammadex. Furthermore, the yield of the reaction is low (43%).

WO2012025937 describes the first step of the synthesis using different reagents than WO2001/040316. According to the applicant the use of $PX_5$ or $PX_3$, where X is F, Cl, Br, I instead of $PPh_3/I_2$ results in better yield and purity of the product of step 1. The use of $PX_5$ and $PX_3$ is not desirable because of their toxicity; furthermore these compounds are corrosive and produce fumes, making its handling on large scale more difficult.

WO2014125501 discloses preparation of Sugammadex involving the use of alkali metal alkoxides in the second step instead of NaH. These alkoxides are flammable and therefore difficult to work with.

Therefore, there exists a need for an improved and efficient process for the preparation of Sugammadex.

BRIEF DESCRIPTION OF THE PRESENT INVENTION

The subject of the present invention is a novel synthetic route to Sugammadex.

The invention provides a process to synthesize Sugammadex comprising the steps of:

a) Substituting the primary hydroxyl groups of the γ-cyclodextrin by halogen to give the corresponding 6-perdeoxy-6-per-halo-γ-cyclodextrin compound of formula (3), b. Reacting the compound of formula (3) with 3-mercaptopropionic acid in the presence of a sodium base and DMSO.

The starting material of step a) is γ-cyclodextrin. This cyclodextrin is commercially available.

The first step of the process of the present invention includes providing the compound of formula (3). This compound can be obtained by substituting the primary hydroxyl groups of the γ-cyclodextrin with a halo-group using a Vilsmeier-Haack reagent (4),

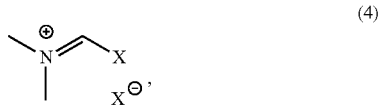

(4)

wherein X is F, Cl, Br, I, more preferably X is Br.

The Vilsmeier-Haack reagent can be formed in different ways for instance using $PX_3$ or $PX_5$ and DMF or $PPh_3$/$C_6H_5NMe_3X_3$ and DMF. Wherein X is F, Cl, Br, I, more preferably X is Br.

In a preferred embodiment the Vilsmeier-Haak reagent is formed according to scheme 1, (Scheme 1)

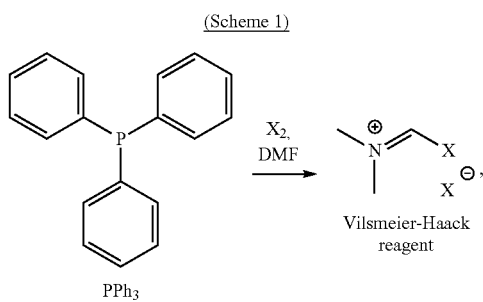

wherein X is F, Cl, Br, I, more preferably X is Br

The Vilsmeier-Haack reagent can be prepared in situ or prior to reaction with unprotected γ-cyclodextrin. In a preferred embodiment the Vilsmeier-Haack reagent is prepared and washed with cold N,N-dimethylformamide prior to reaction with unprotected γ-cyclodextrin. In this way, a significant portion of the triphenylphosphine oxide can be removed before reaction with γ-cyclodextrin, hence reducing the subsequent effort required to remove this persistent by-product and avoiding the formation of impurity (2).

The freshly prepared Vilsmeier-Haack reagent is suspended in DMF and γ-cyclodextrin is added. It is important that the reaction is done under dry conditions to avoid impurities, therefore the γ-cyclodextrin is dried, for instance under vacuum, before being used. The DMF solvent should also be dried.

In order to obtain a complete reaction at least 16 equivalents of Vilsmeier-Haack reagent are typically used.

The resulting suspension is heated. A suitable temperature is a reaction temperature from 40 to 60° C., more preferably from 45 to 55° C. At this range of temperatures the yield and purity are optimal. If temperature is too high, for instance higher than 70° C., degradation takes place.

The reaction time can vary from 6 to 24 hours. In a preferred embodiment the reaction time is between 15 to 20 hours. After this time a strong base is used to bring the reaction mixture to basic pH. Without establishing limitations, a suitable base is sodium methoxide. A suitable pH is from 9 to 10. Alternatively the reaction mixture can be concentrated before adding the strong base.

After work up, the desired compound of formula (3) precipitates. Optionally the compound of formula (3) can be further purified by recrystallization or being washed with an organic solvent such as methanol, dichloromethane or acetone. A preferred organic solvent to be used in the recrystallization is methanol.

However, it was found that it is not possible to remove lower substituted halides by washing. The generation of lower substituted halides is prevented by bringing the substitution reaction as much as possible to completion. In the event that the substitution is not complete, the addition of extra Vilsmeier-Haack reagent can still drive the reaction further.

In the second step of the process of the present invention the compound of formula (3) is converted to Sugammadex in the presence of a sodium base and DMSO.

In the prior art, the second step was performed in DMF (dimethylformamide) which is a toxic solvent that causes birth defects. Surprisingly the inventors have found that the reaction can be performed in DMSO (dimethylsulfoxide) which is non hazardous.

γ-cyclodextrin has 8 primary hydroxyl groups (groups attached to a $CH_2$—) and 16 secondary hydroxyl groups (groups attached to a CHR—), in the present invention the 8 primary hydroxyl groups are substituted to form Sugammadex. The synthesis of Sugammadex is complicated by the fact that it requires the complete conversion of eight identical functional groups per molecule, giving rise to high levels of impurities. Most of these impurities are structurally related γ-cyclodextrins and have physico-chemical characteristics and molecular weights comparable to that of the active substance. This explains why the structurally related impurities are difficult to fully identify and to remove from the active substance. The inventors have found that when the primary hydroxyl groups of the γ-cyclodextrin are substituted with a halogen, preferably Br, and further reacted with DMSO in the presence of sodium base the yield to the final Sugammadex is increased to above 95%. To get a higher final yield is very important because of the difficulties of purification before mentioned. Furthermore, in this way the use of DMF which is hazardous is avoided.

In the second step of the reaction 6-per-deoxy-6-per-halo-γ-cyclodextrin is dissolved in DMSO, 3-mercaptopropionic acid is added, followed by addition of a sodium base.

A suitable sodium base to perform the second step is without limitations NaOH, NaH and $Na_2CO_3$. A preferred base is aqueous NaOH. Preferably, the NaOH concentration is from 2 to 9M, more preferably from 3 to 7M, even more preferably 5M. When the concentration of NaOH(aq) is higher than 10M, epimerization may occur. When the concentrations of NaOH(aq) is lower than 1M the final product may not be completely substituted.

Preferably 8 to 15 equivalents of 3-mercaptopropionic acid are added, most preferably 9 to 12, even more preferably 10 equivalents of acid are added. In the case of the sodium base when less than 21 equivalents were added the internal ester impurity (compound of formula (5)) was substantially higher,

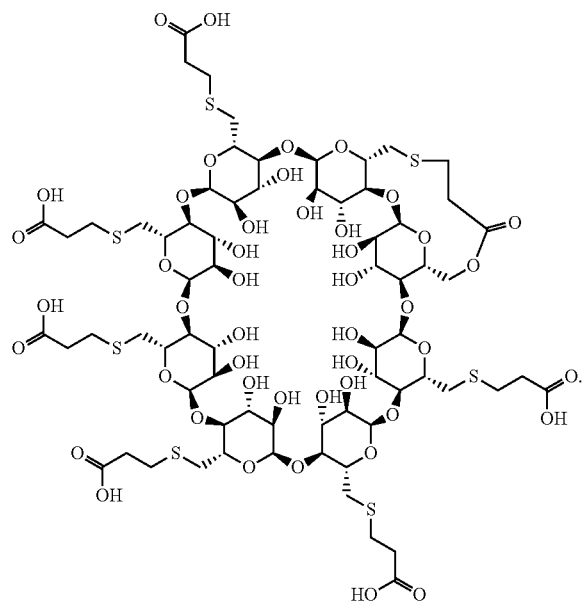

(5)

Therefore, preferably 25 to 35 equivalents of sodium base are added, more preferably 27 to 32 even more preferably 30 equivalents are added.

The speed and the temperature of addition of the sodium base are important to the composition of the final isolated product. In case the reaction mixture was heated before the addition of the sodium base the isolated product shows a rather low content of Sugammadex, but a relatively large amount of compound 5. The best results were obtained when aqueous sodium hydroxide was added at ambient temperature, just before heating.

In a preferred embodiment the sodium base is added over a period of at least 8 minutes, in a most preferred embodiment the sodium base is added at ambient temperature, just before heating over a period between 8 to 40 minutes. If the sodium base is added fast (in less than 3 minutes), the conversion may not be completed. On the other hand, the extension of the addition time to 40 minutes, did not show any change in conversion and composition of isolated product, compared with lower temperatures.

In the prior art the reaction from 6-per-deoxy-6-per-halo-γ-cyclodextrin to Sugammadex was performed at temperatures around 70° C. Normally, when the temperature of a reaction is increased more impurities are obtained but shorter times are achieved. The inventors have surprisingly found that when DMSO and a sodium base, preferably NaOH, is used the reaction takes place at lower temperatures (between 30 and 65° C.) and in shorter time (around 2 hours) than what is described in the prior art. The shortest reaction time in the prior art was 12 hours (WO2012025937).

In a preferred embodiment step b of the reaction mixture is heated from 30 to 70° C., more preferably from 35 to 65° C., even more preferably from 40 to 60° C., the most preferred between 40 to 55° C.

After the reaction is completed, the crude Sugammadex may be purified in order to remove the impurities not related to Sugammadex, like DMSO, 3-mercaptopropionic acid and the disulfide thereof (formed during synthesis). Washing of the isolated crude solid by e.g. methanol or ethanol does not seem sufficient to remove these impurities completely. Different ways to purify Sugammadex can be used, for instance using stirred ultrafiltration cell, membranes or by precipitation. Preferably precipitation is used. In a preferred embodiment methanol is added to the crude Sugammadex followed by addition of ethanol. The addition of methanol allows fine crystals of Sugammadex to precipitate and the addition of ethanol yields a not sticky solid free from non Sugammadex related impurities.

In a preferred embodiment of the present invention γ-cyclodextrin is reacted with $PPh_3$, $Br_2$ and DMF at a reaction temperature between 40 and 60° C. to obtain 6-per-deoxy-6-per-bromo-γ-cyclodextrin which is reacted with 3-mercaptopropionic acid in aqueous NaOH and DMSO. In a most preferred embodiment the NaOH is added over 12 to 18 minutes before the reaction mixture is heated. After the reaction is concluded, Sugammadex is precipitated out of the crude mixture by using MeOH followed by addition of EtOH.

The following examples are intended to illustrate the scope of the present invention but not to limit it thereto.

EXAMPLES

Example 1

Synthesis of Vilsmeier-Haack Reagent

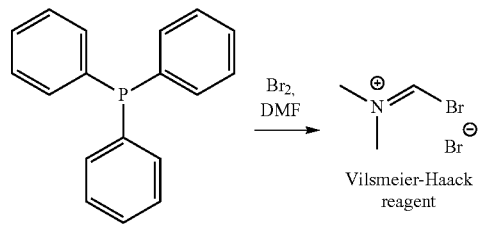

Triphenylphosphine (22.5 g, 86 mmol) was dissolved in N,N-dimethylformamide (100 ml). The solution was cooled with an ice-water bath. Bromine (4.60 ml, 90 mmol) was added drop wise over 10 minutes. The suspension was stirred for 1 hour in ice-water. The solid was isolated by filtration under nitrogen and washed with cold N,N-dimethylformamide. The isolated Vilsmeier-Haack reagent (white, slightly yellow solid) was used immediately in the reaction with γ-cyclodextrin.

Example 2

Synthesis of 6-per-deoxy-6-per-bromo-γ-cyclodextrin

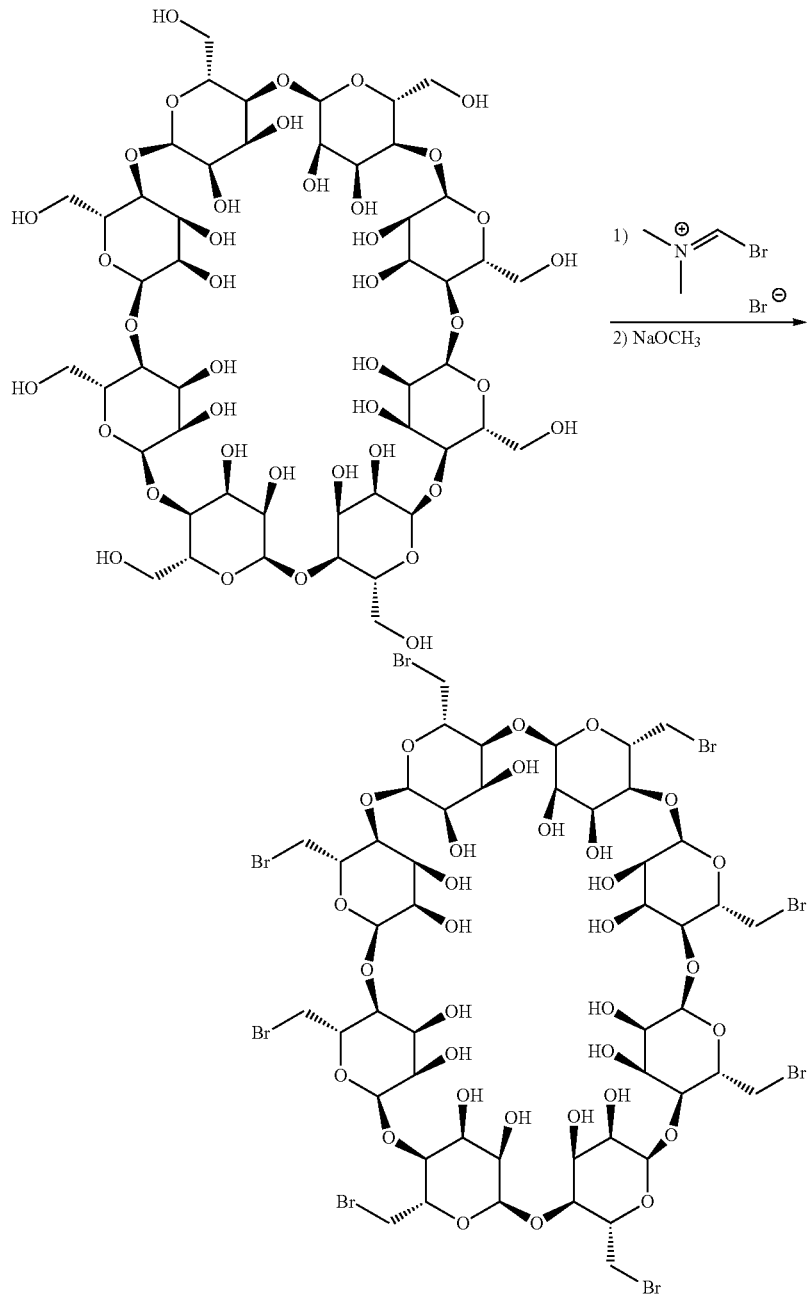

The total amount of freshly prepared Vilsmeier Haack reagent from example 1 was suspended in N,N-dimethylformamide (75 ml). γ-Cyclodextrin (5 g, 3.85 mmol) (dried o/n under vacuum at 80° C.) was added. The resulting yellow suspension was heated to 50° C. (=Toil bath) and was kept at this temperature. After 20 hours, the yellow solution was allowed to cool to ambient temperature. The solution was cooled with an ice-water bath. Sodium methanolate, 30 wt % in methanol, was added until pH=9-10. In total, 12 ml was needed. The resulting yellow solution was stirred for 1 hour at ambient temperature and was then concentrated in vacuo. The slightly yellow solid/oil was cooled with an ice-water bath and water (75 ml) was added. The suspension was stirred over night at 4° C. The solid was isolated by filtration and washed with water (20 ml) and methanol (3×25 ml).

The solid was dried over night under vacuum at 40° C.

Isolated product: 6.84 g (99%), (off-)white solid

NMR: confirmed the expected structure

Example 3

Synthesis of Sugammadex

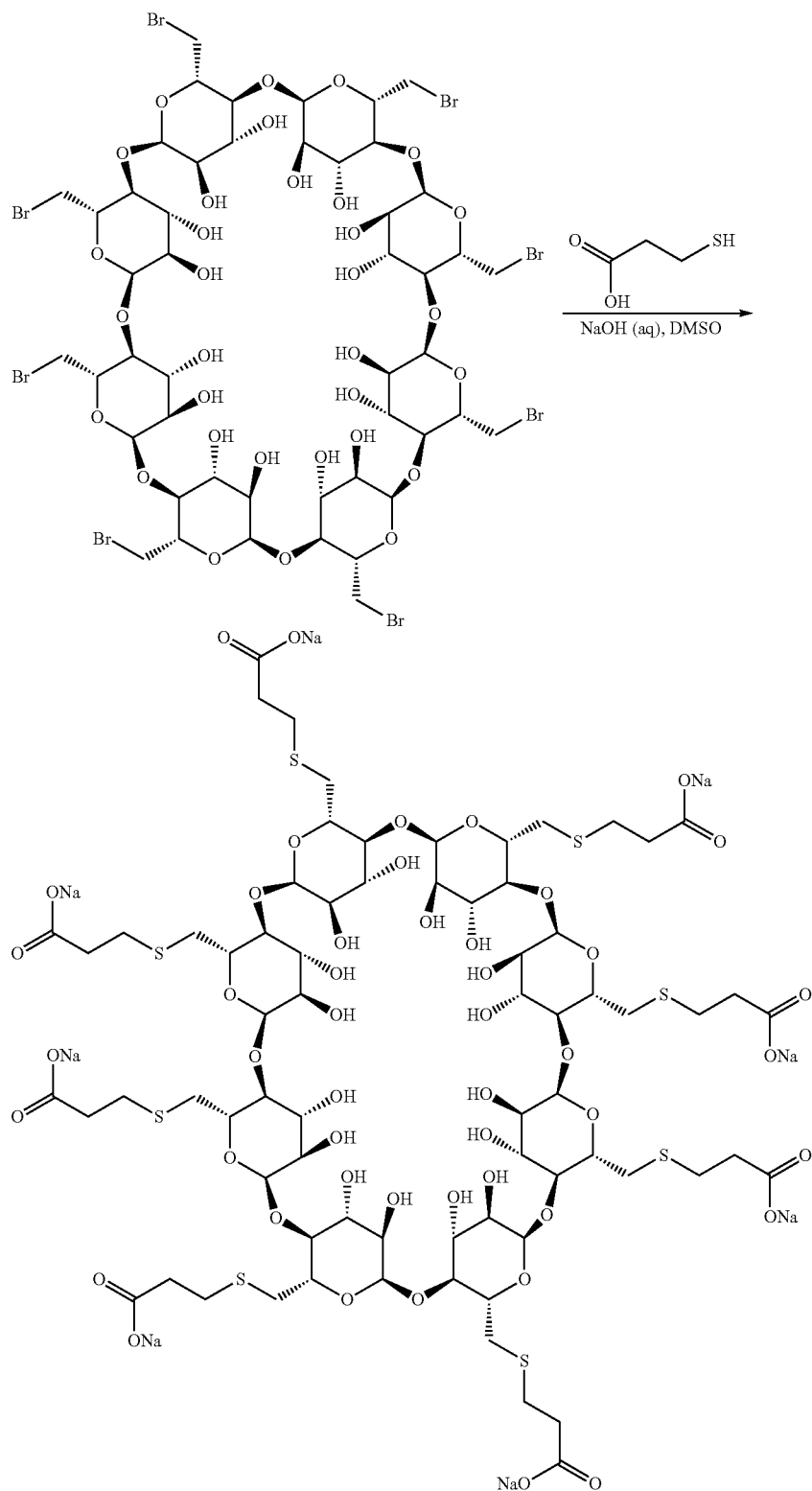

6-Per-deoxy-6-per-bromo-γ-cyclodextrin (200 mg, 0.111 mmol) from example 2 was dissolved in dimethyl sulfoxide (4 ml). 3-Mercaptopropionic acid (99 μl, 1.138 mmol) was added. Sodium hydroxide (667 μl, 3.34 mmol), 5 M in water, was added drop wise over 15 minutes. The mixture was stirred for 5 minutes at ambient temperature and was then heated to 50° C. (=Toil bath). The reaction mixture was kept at 50° C. (=Toil bath). Reaction progress was monitored with HPLC.

After 2 hours at 50° C., the reaction mixture was allowed to cool to ambient temperature. Ethanol (10 ml) was added and the reaction mixture was stirred for 10 minutes. The solid was isolated by filtration and washed with ethanol (5 ml). The solid was transferred into a 50 ml flask. The filter was washed with water (2 ml). This liquid was added to the solid in the 50 ml flask, resulting in a clear solution. To the solution, methanol (10 ml) was added. The suspension was stirred for 5 minutes. Ethanol (5 ml) was added and the suspension was stirred for 30 minutes at ambient temperature.

The solid was isolated by filtration and washed with ethanol (10 ml).

The solid was dried for 6 days under vacuum at 60° C.
Isolated solid: 236 mg (98%), (off-)white solid,
HPLC: 88.4% purity
NMR: confirmed the expected structure

The invention claimed is:

1. A process to synthesize Sugammadex comprising the steps of:
   a) substituting the primary hydroxyl groups of the γ-cyclodextrin by bromine to give the corresponding 6-per-deoxy-6-per-bromo-γ-cyclodextrin compound of formula (3),

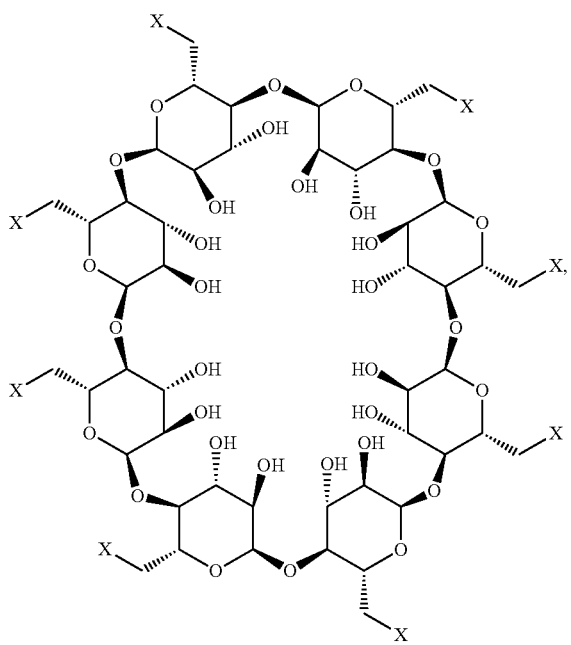

(3)

wherein X is Br; and b) reacting the compound of formula (3) with 3-mercaptopropionic acid in the presence of a sodium base and DMSO.

2. The process according to claim 1, wherein the sodium base is aqueous sodium hydroxide.

3. The process according to claim 2, wherein aqueous sodium hydroxide is used in a concentration from 3 to 7 Molar.

4. The process of claim 1, wherein 8 to 15 equivalents of 3-mercaptopropionic acid are used.

5. The process of claim 1, wherein from 25 to 35 equivalents of sodium base are used.

6. The process according to claim 1, wherein the base of step b) is added over a period of at least 8 min.

7. The process according to claim 1, wherein the sodium base of step b) is added to the 3-mercaptopropionic acid and to the resulting solution the 6-per-deoxy-6-per-bromo-γ-cyclodextrin in DMSO is added.

8. The process according to claim 1, wherein 6-per-deoxy-6-per-bromo-γ-cyclodextrin is dissolved in DMSO, 3-mercaptopropionic acid is added followed by addition of the base of step b).

9. The process according to claim 1, wherein the reaction temperature of step b) is from 30 to 70° C.

10. The process according to claim 1, wherein Sugammadex is precipitated by adding subsequently methanol and ethanol.

11. The process according to claim 1, wherein Sugammadex is isolated by
   i) adding water till complete dissolution followed by addition of one or more organic solvents, wherein one of the organic solvents is water miscible; and
   ii) decreasing the temperature of the mixture to 0-10° C. to obtain Sugammadex solid.

12. The process according to claim 11 where the organic solvent is DMSO.

13. The process according to claim 1, wherein the compound of formula (3) has been synthesized by reacting γ-cyclodextrin with PPh$_3$, X$_2$ and DMF, wherein X is Br.

* * * * *